Patented Oct. 14, 1941

2,258,977

UNITED STATES PATENT OFFICE 2,258,977

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application September 22, 1939, Serial No. 296,116

8 Claims. (Cl. 260—153)

This invention relates to the art of dyeing or coloring. More particularly, it relates to new azo dye compounds and the application of the nuclear non-sulfonated compounds for the coloration of organic derivatives of cellulose particularly textile material made of or containing an organic derivative of cellulose by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo compounds of our invention have the general formula:

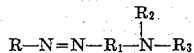

wherein R represents the residue of an aryl nucleus of the benzene series, $R_1$ represents the residue of a member selected from the group consisting of an aryl nucleus of the benzene series and an aryl nucleus of the naphthalene series, $R_2$ represents a member selected from the group consisting of hydrogen, an alkyl group, an allyl group, a cycloalkyl group and a furyl group and $R_3$ represents the residue of a 1,3,5-triazine nucleus joined through a nuclear carbon atom to the nitrogen atom shown.

While our invention relates broadly to azo compounds having the general formula just given, it relates more particularly to azo compounds of the above general formula, wherein R and $R_1$ each represents the residue of an aryl nucleus of the benzene series, $R_2$ represents a hydroxyalkyl group and $R_3$ represents the residue of said 1,3,5-triazine nucleus.

It will be understood that alkyl, as used herein, unless otherwise indicated, includes not only unsubstituted alkyl groups such as a methyl group, an ethyl group, a propyl group, or a butyl group, but also substituted alkyl groups such as β-hydroxyethyl, β-hydroxypropyl, β,γ-hydroxypropyl, γ-hydroxypropyl, β-methoxyethyl, β-ethoxyethyl, or β-sulfoethyl, for example. Illustrative of halogen may be mentioned chlorine, bromine and iodine. Illustrative of cycloalkyl may be mentioned cyclobutyl and cyclohexyl. Similarly, illustrative of furyl may be mentioned a furyl radical such as furfuryl or tetrahydrofurfuryl.

The azo compounds of our invention can be prepared by diazotizing a primary aminobenzene and coupling the diazonium compound obtained with a 1,3,5-triazine coupling compound having the general formula:

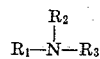

wherein $R_1$, $R_2$ and $R_3$ have the meaning previously assigned to them.

In order that our invention may be clearly understood, the structural formula of 1,3,5-triazine and its numbering is given hereinafter:

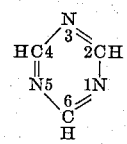

The numbering given is that which will be employed herein. Coupling is believed to take place through the aryl nucleus of the benzene or naphthalene series which is attached to the 2-position of the 1,3,5-triazine nucleus. Accordingly, no group should be present in this aryl nucleus in the position in which coupling occurs, and no group which would prevent coupling should be present.

As previously indicated, the nuclear non-sulfonated azo dye compounds of our invention constitute valuable dyes for the coloration of organic derivatives of cellulose such as those hereinbefore mentioned yielding various shades thereon of good fastness to light and washing. These nuclear non-sulfonated dye compounds likewise possess application for the coloration of wool and silk and yield generally similar shades on these materials as on organic derivatives of cellulose. The nuclear sulfonated compounds of our invention possess little or no utility for the coloration of organic derivatives of cellulose but can be employed to color textile materials such as wool and silk. These nuclear sulfonated compounds can be prepared in known fashion. They can be prepared, for example, by the use of previously sulfonated components or by subsequent sulfonation of the unsulfonated compounds. For the dyeing of organic derivatives of cellulose such as cellulose acetate silk, nuclear non-sulfonated compounds wherein R and R₁ represent the residue of an aryl nucleus of the benzene series are generally advantageous.

The following examples illustrate the preparation of the azo dye compounds of our invention.

Example 1

.1 gram mole of o-chloroaniline is dissolved in a mixture of 150 cc. of water and 25 cc. of 36% hydrochloric acid. The resulting solution is then cooled by the addition of ice, or in any manner desired, to about 0–5° C. and the o-chloroaniline is diazotized by adding, with stirring, 6.9 grams of sodium nitrite dissolved in water while maintaining the temperature at about 0–5° C.

.1 gram mole of 2-(m-methylphenyl)-ethylamino-4-amino-6-chloro-1,3,5-triazine is dissolved in glacial acetic acid and the resulting solution is cooled to a temperature approximating 0–10° C. The diazonium solution prepared as described above is then slowly added with stirring while maintaining a temperature of 0–10° C. The mixture is allowed to stand for a time after which it is made neutral to Congo red paper by the addition of sodium acetate. Upon completion of the coupling reaction which takes place, the dye compound formed is precipitated by adding water, recovered by filtration, washed with water and dried. The dye compound obtained has the formula:

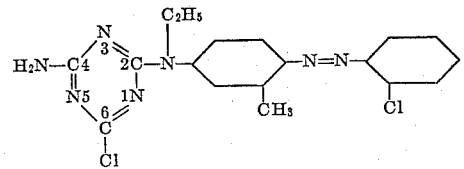

and colors cellulose acetate silk a yellow shade.

Example 2

.1 gram mole of o-fluoroaniline is diazotized and the diazonium compound obtained is coupled with .1 gram mole of 2-methylphenylamino-4,6-diamino-1,3,5-triazine. The diazotization, coupling and recovery operations may be carried out in accordance with the general methods described in Example 1. The dye compound obtained has the formula:

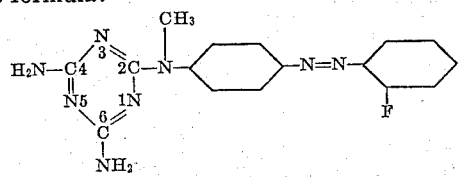

and colors cellulose acetate silk a yellow shade.

Example 3

.1 gram mole of m-anthranilate is diazotized in known fashion and the diazonium compound obtained is coupled with .1 gram mole of 2-β-hydroxyethylphenylamino-4,6-dimethylamino-1,3,5-triazine. Coupling and recovery of the dye compound formed may be carried out in accordance with the method described in Example 1. The dye compound obtained has the formula:

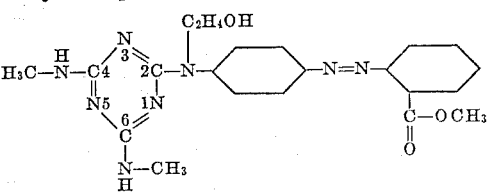

and colors cellulose acetate silk a yellow shade.

Example 4

.1 gram mole of p-aminoacetophenone is diazotized in known fashion and the diazonium compound obtained is coupled with .1 gram mole of 2 - glyceryl - (2' - methyl-5'-methoxyphenyl) amino - 4,6 - tetraethyldiamino - 1,3,5 - triazine. Coupling and recovery of the dye compound formed may be carried out as described in Example 1. The dye compound obtained has the formula:

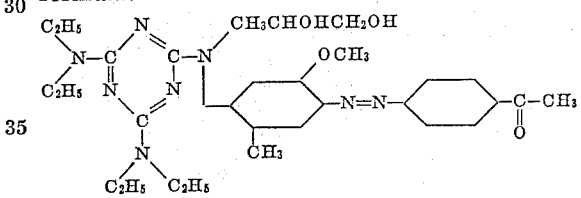

and colors cellulose acetate silk an orange shade.

Example 5

.1 gram mole of p-aminobenzenesulfonamide is diazotized in known fashion and the diazonium compound obtained is coupled with .1 gram mole of 2 - sodium - β - sulfoethyl- (2',5' - dimethoxyphenyl) amino-4-ethoxy-6-cyclohexylamino-1,3,5-triazine. Coupling and recovery of the dye compound formed may be carried out as described in Example 1. The dye compound obtained colors cellulose acetate silk, wool and silk an orange shade.

Example 6

.1 gram mole of 2,5-dichloroaniline is diazotized in known fashion and the diazonium compound obtained is coupled with .1 gram mole of 2-β-chloroethyl - (m-methoxyphenylamino) - 4-hydroxy - 6 - di-β-hydroxyethylamino-1,3,5-triazine. Coupling and recovery of the dye compound may be carried out as described in Example 1. The dye compound obtained colors cellulose acetate silk an orange-yellow shade.

By heating the dye compound of this example with pyridine, a dye compound included within the scope of our invention is obtained in which the 2-β-chloroethyl group is converted to a

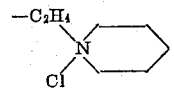

group.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 6, inclusive.

compounds employed in their manufacture can be prepared either as described or in accordance with the methods described in Berichte der Deutschen Chemischen Gesellschaft, vol. 19, pages 242–244, inclusive, and pages 2055–2060, inclusive.

Both water soluble and water insoluble azo dye compounds are included within the scope of our

|   | Amine | Coupling component | Color on cellulose acetate silk |
|---|---|---|---|
| 1 | o-Chloroaniline | 2-(m-methylphenyl) amino-4-amino-6-chloro-1,3,5-triazine | Yellow. |
| 2 | p-Nitroaniline | 2-γ-hydroxypropylphenylamino-4,6-dihydroxy-1,3,5-triazine | Red. |
| 3 | 1-amino-2-chloro-4-nitrobenzene | 2-β-methoxyethylphenylamino-4-sodium-β-sulfatoethyl-amino-6-amylamino-1,3,5-triazine. | Do. |
| 4 | 1-amino-2-bromo-4-nitrobenzene | 2-diphenylamino-4-sodium-β-sulfatoethoxy-6-laurylamino-1,3,5-triazine. | Do. |
| 5 | 1-amino-2,4-dinitrobenzene | 2-(2′,5′-dimethoxyphenyl)-γ-methoxy-β-hydroxypropyl-amino-4-methylamino-6-butylamino-1,3,5-triazine. | Violet. |
| 6 | 1-amino-2,4-dinitro-6-bromo-benzene | 2-(glyceryl-α-naphthyl)amino-4,6-di-β-hydroxyethylamino-1,3,5-triazine. | Blue. |
| 7 | 2-amino-5-nitro-phenylmethylsulfone | 2-(β-hydroxyethyl-5′-hydroxy-α-naphthyl)-amino-4,6-di-amino-1,3,5-triazine. | Do. |
| 8 | p-Aminoazo-benzene | 2-(m-chlorophenyl-tetrahydrofurfuryl)-amino-4-furfuryl-amino-6-hydroxy-1,3,5-triazine. | Orange. |
| 9 | 1-amino-2-chloro-4-nitrobenzene | 2-(n-propyl-phenyl) amino-4-bromo-6-hydroxy-1,3,5-triazine | Rubine. |
| 10 | 1-amino-2,4-dinitro-6-chlorobenzene | 2-(cyclohexyl-phenyl)-amino-4,6-diamino-1,3,5-triazine | Violet. |
| 11 | p-Aminoacetophenone | 2-(furfuryl-phenyl)-amino-4-sodium-β-sulfoethylamino-6-amino-1,3,5-triazine. | Orange. |
| 12 | p-Nitroaniline | 2-(allyl-phenyl)-amino-4-amino-6-furfurylamino-1,3,5-triazine. | Red. |
| 13 | o-Nitroaniline | 2-(n-butyl-α-naphthyl)-amino-4-methoxy-6-amino-1,3,5-triazine. | Orange. |
| 14 | 1-amino-2-bromo-4-nitrobenzene | 2-(5′-hydroxy-α-naphthyl)-amino-4,6-di-γ-hydroxypropyl-amino-1,3,5-triazine. | Blue. |
| 15 | 1-amino-4-cyano-benzene | 2-(5′-hydroxyfurfuryl-phenyl)-amino-4,6-diethylamino-1,3,5-triazine. | Orange. |
| 16 | 1-amino-2-hydroxy-4-nitro-benzene | 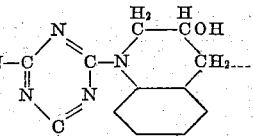 | Pinkish-red. |
| 17 | 1-amino-2,4-dinitro-6-chloro-benzene | 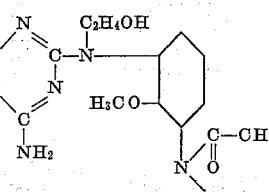 | Blue. |

While the nuclear non-sulfonated compounds of our invention possess more or less general application for the coloration of wool and silk, compounds of the character of those numbered 3, 4 and 11 in the above tabulation appear to be more particularly suited for the coloration of wool and silk.

Nuclear sulfonated compounds corresponding to the nuclear non-sulfonated compounds shown herein can be prepared by sulfonating said non-sulfonated compounds or by employing sulfonated diazo components. Suitable sulfonated amines which can be diazotized and coupled with any of the coupling components shown herein include, for example, m-sulfanilic acid, p-sulfanilic acid, 1-amino-2-sulfo-4-nitrobenzene, 1-amino-2-nitro-4-sulfo-benzene, 1-amino-2-chloro-4-sulfo-benzene and 1-amino-2-sulfo-4-bromobenzene.

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of our invention.

In order that our invention may be clearly understood, it is here noted that the 1,3,5-triazine invention. Those compounds which are insoluble in water may be advantageously employed for the direct dyeing of textile materials by grinding the dye to a fine powder intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. For a more complete description as to how the water insoluble azo dye compounds of our invention can be employed for the dyeing of organic derivatives of cellulose, reference may be had to our U. S. Letters Patent No. 2,115,030, issued April 26, 1938. The water insoluble azo dye compounds of our invention, as previously noted, also possess application for the dyeing of wool and silk and they may be applied to these materials in the same manner as they are applied to organic derivatives of cellulose.

The water soluble dye compounds of our invention may be applied to wool, silk and (depending upon the nature and position of the water solubilizing group) organic derivatives of cellulose textile materials from an aqueous solution of the dye which may contain salt. These water soluble dye compounds can be applied to the fiber in substantially the same manner as the water insoluble dye compounds. In the case of the water soluble dye compounds, however, the use of a dispersing or solubilizing agent is not necessary. It will be understood, of course, that the above remarks concerning the application of the dye compounds of our invention to textile materials are merely illustrative and that any of the customary methods for applying dyes of the character here involved can be employed.

We claim:

1. The nuclear non-sulfonated monoazo dye compounds having the general formula:

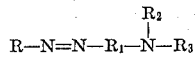

wherein R and $R_1$ each represents the residue of and aryl nucleus of the benzene series containing but one benzene nucleus, $R_2$ represents a member selected from the group consisting of hydrogen, an alkyl group, an allyl group, a cycloalkyl group and a furyl group and $R_3$ represents the residue of a 1,3,5-triazine nucleus joined through a nuclear carbon atom to the nitrogen atom shown.

2. The azo compounds having the general formula:

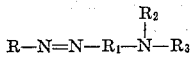

wherein R represents the residue of an aryl nucleus of the benzene series, $R_1$ represents the residue of a member selected from the group consisting of an aryl nucleus of the benzene series and an aryl nucleus of the naphthalene series, $R_2$ represents a hydroxyalkyl group and $R_3$ represents the residue of a 1,3,5-triazine nucleus joined through a nuclear carbon atom to the nitrogen atom shown.

3. The azo compounds having the general formula:

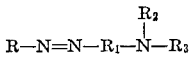

wherein R and $R_1$ each represents the residue of an aryl nucleus of the benzene series, $R_2$ represents a hydroxyalkyl group and $R_3$ represents the residue of a 1,3,5-triazine nucleus joined through a nuclear carbon atom to the nitrogen atom shown.

4. The azo compounds having the general formula:

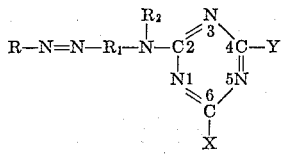

wherein R and $R_1$ each represents the residue of an aryl nucleus of the benzene series, $R_2$ represents a hydroxyalkyl group, and X and Y each represents a member selected from the group consisting of a halogen atom, a hydroxyl group, an O-alkyl group and a

group, wherein $R_4$ and $R_5$ each represents a member selected from the group consisting of hydrogen, an alkyl group, an allyl group, a cycloalkyl group and a furyl group.

5. Material made of or containing an organic derivative of cellulose and in which said organic derivative of cellulose is colored with a nuclear non-sulfonated azo dye compound having the general formula:

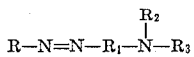

wherein R represents the residue of an aryl nucleus of the benzene series, $R_1$ represents the residue of a member selected from the group consisting of an aryl nucleus of the benzene series and an aryl nucleus of the naphthalene series, $R_2$ represents a member selected from the group consisting of hydrogen, an alkyl group, an allyl group, a cycloalkyl group and a furyl group and $R_3$ represents the residue of a 1,3,5-triazine nucleus joined through a nuclear carbon atom to the nitrogen atom shown.

6. Material made of or containing an organic derivative of cellulose and in which said organic derivative of cellulose is colored with a nuclear non-sulfonated azo dye compound having the general formula:

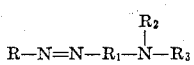

wherein R and $R_1$ each represents the residue of an aryl nucleus of the benzene series, $R_2$ represents a hydroxyalkyl group and $R_3$ represents the residue of a 1,3,5-triazine nucleus joined through a nuclear carbon atom to the nitrogen atom shown.

7. A cellulose acetate colored with a nuclear non-sulfonated azo dye compound having the general formula:

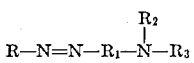

wherein R represents the residue of an aryl nucleus of the benzene series, $R_1$ represents the residue of a member selected from the group consisting of an aryl nucleus of the benzene series and an aryl nucleus of the naphthalene series, $R_2$ represents a member selected from the group consisting of hydrogen, an alkyl group, an allyl group, a cycloalkyl group and a furyl group and $R_3$ represents the residue of a 1,3,5-triazine nucleus joined through a nuclear carbon atom to the nitrogen atom shown.

8. A cellulose acetate colored with a nuclear non-sulfonated azo dye compound having the general formula:

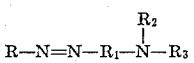

wherein R and $R_1$ each represents the residue of an aryl nucleus of the benzene series, $R_2$ represents a hydroxyalkyl group and $R_3$ represents the residue of a 1,3,5-triazine nucleus joined through a nuclear carbon atom to the nitrogen atom shown.

JOSEPH B. DICKEY.
JAMES G. McNALLY.